(12) United States Patent
Adachi et al.

(10) Patent No.: US 7,279,817 B2
(45) Date of Patent: Oct. 9, 2007

(54) MOTOR AND METHOD OF MANUFACTURING THE SAME

(75) Inventors: Tadashi Adachi, Kosai (JP); Youichi Matsuyama, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 140 days.

(21) Appl. No.: 10/542,165

(22) PCT Filed: Mar. 11, 2004

(86) PCT No.: PCT/JP2004/003174

§ 371 (c)(1),
(2), (4) Date: Jul. 14, 2005

(87) PCT Pub. No.: WO2004/084379

PCT Pub. Date: Sep. 30, 2004

(65) Prior Publication Data

US 2006/0113852 A1    Jun. 1, 2006

(30) Foreign Application Priority Data

Mar. 20, 2003  (JP)  ............................. 2003-077959

(51) Int. Cl.
H02K 5/22   (2006.01)
H02K 7/10   (2006.01)
H02K 11/00  (2006.01)
H02K 23/00  (2006.01)

(52) U.S. Cl. ...................... 310/71; 310/75 R
(58) Field of Classification Search .................. 310/71, 310/75 R, 89
See application file for complete search history.

(56) References Cited

U.S. PATENT DOCUMENTS

| 5,485,044 | A | * | 1/1996 | Mackay et al. | ............... 310/90 |
| 6,051,794 | A | * | 4/2000 | Katou et al. | ............ 174/152 G |
| 6,398,582 | B1 | | 6/2002 | Matsuyama et al. | |
| 6,700,245 | B2 | * | 3/2004 | Yamamura et al. | ....... 310/75 R |
| 6,756,711 | B2 | * | 6/2004 | Matsuyama et al. | ...... 310/68 R |

FOREIGN PATENT DOCUMENTS

| JP | U-62-154762 | | 10/1987 |
| JP | A-11-243659 | | 9/1999 |
| JP | 2002119010 | A * | 4/2002 |
| JP | 2003009458 | A * | 1/2003 |

OTHER PUBLICATIONS

Written Opinion issued from Japanese Patent Office issued on Apr. 6, 2004 for the corresponding Japanese patent application No. PCT/JP2004/003174 (English translation thereof).

* cited by examiner

*Primary Examiner*—Burton Mullins
(74) *Attorney, Agent, or Firm*—Posz Law Group, PLC

(57) ABSTRACT

A connector housing 45 is formed separately from a gear housing 20 and a closing and fixing member 21. The connector housing 45 includes a retainer 49, which supports an external connector 48 relative to the closing and fixing member 21, and an elastically deformable grommet 50. A retainer-side end of the grommet 50 is interposed between a flange portion of the retainer 49 and an outer surface of the closing and fixing member 21, and the connector housing 45 is secured to a connector installation opening 43. With this construction, it is possible to achieve a high degree of design freedom and to provide a motor having a drip-proof structure of a relatively simple configuration.

11 Claims, 8 Drawing Sheets (a)

(b)

(a)

(b)

MOTOR AND METHOD OF MANUFACTURING THE SAME

TECHNICAL FIELD

The present invention relates to a motor and a method of manufacturing the same.

BACKGROUND ART

One previously proposed motor for use in a power window system includes: a motor arrangement for generating a rotational force; a speed reducing arrangement formed by housing a speed reducing mechanism in a gear housing; a control circuit board over which electrical circuit components are mounted; and a connector portion to which an external connector is fitted (see, for example, Japanese Unexamined Patent Publication No. 2000-220344).

Water droplets splashed onto a glass of a door can enter the interior of the door. Thus, a motor main body is provided with a drip-proof structure for protecting its electrical system. In the motor described in the above publication, a grommet, which covers an outer peripheral surface of the external connector, is formed separately from the gear housing, in which the connector portion is formed integrally. The grommet is fitted to the connector portion, so that the external connector is water proofed. In this way, a detachment restraining construction and a drip-proof structure are formed between the connector portion and the grommet.

More specific description will be given. The connector portion is provided on its outer peripheral surface with a plurality of engaging projections, and the grommet is provided with engaging holes corresponding to the engaging projections. The detachment restraining construction is thereby formed. The grommet is provided on its inner peripheral surface with a plurality of annular lip seal portions that are circumferentially closed and abutted against the side surface of the connector portion. Further, the grommet is provided on its outer peripheral surface with projected abutting portions. The drip-proof structure is thereby formed.

However, to make the detachment restraining construction and the drip-proof structure reliable, the following means are taken: a plurality of recesses and projections are formed on the outer peripheral surface of the connector portion, the inner peripheral surface of the grommet, and the like. This complicates the shapes of the connector portion and the grommet. Since the gear housing having the connector portion and the grommet are molded with metal molds and the like, a complicated shape raises the tooling cost and the like. This causes disadvantages associated with production cost.

An extremely complicated shape makes it difficult to mold a gear housing having a connector portion or a grommet from one item. Therefore, there are cases where, since the detachment restraining construction and the drip-proof structure are formed, limitations are imposed on other parts in terms of design.

The shape of an external connector is modified according to the specifications for the motor. For this reason, when the connector portion into which the external connector is fitted is integrally formed on a gear housing, a problem arises. The design of the entire gear housing must be reviewed in accordance with the shape of the external connector.

The present invention has been made to solve the above disadvantages. An object of the present invention is to achieve a high degree of design freedom and to provide a motor having a drip-proof structure of a relatively simple configuration and to provide a method of manufacturing such a motor.

DISCLOSURE OF THE INVENTION

To attain the above object, there is provided a motor including a motor arrangement, a speed reducing arrangement a control circuit board and a connector housing. The speed reducing arrangement includes a speed reducing mechanism that decelerates rotation of the motor arrangement, and a speed reducing mechanism receiving portion that receives the speed reducing mechanism. The control circuit board is received in the speed reducing mechanism receiving portion. At least motor-side terminals for supplying electric power to the motor arrangement are mounted on the control circuit board as electrical circuit components. An external connector for connecting with the motor-side terminals is fitted to the connector housing. The connector housing is formed separately from the speed reducing mechanism receiving portion. The connector housing at least includes a connector supporting member that supports the external connector relative to the speed reducing mechanism receiving portion, and an installation opening sealing member that is elastically deformable. The installation opening sealing member is interposed between the connector supporting member and an outer surface of the speed reducing mechanism receiving portion and is secured to a connector installation opening, which is formed in the speed reducing mechanism receiving portion.

In the motor according to the present invention, the connector supporting member into which the external connector is actually fitted is formed separately from the speed reducing mechanism receiving portion. For this reason, when the shape of the external connector is modified according to the specifications for the motor, that can be coped with by modifying the connector housing without changing the shape of the speed reducing mechanism receiving portion. The connector housing is comprised of at least the connector supporting member and the installation opening sealing member. When the connector housing is fixed in the connector installation opening formed in the speed reducing mechanism receiving portion, the installation opening sealing member is interposed between the connector supporting member and the side surface of the speed reducing mechanism receiving portion. For this reason, the connector supporting member presses and brings the installation opening sealing member into contact with the side surface of the speed reducing mechanism receiving portion. Thus, it elastically deforms and brings the installation opening sealing member into tight contact with the side surface of the speed reducing mechanism receiving portion. Therefore, the connector installation opening is sealed without forming sealing recesses and projections or the like on the outer peripheral surface of the connector supporting member for sealing the connector installation opening. As a result, the shape of the connector supporting member can be simplified.

In the above-mentioned motor according to the present invention, the connector supporting member is preferably formed into a tubular body and includes an annular flange portion, which protrudes outward from an outer peripheral surface of the connector supporting member. The installation opening sealing member is preferably interposed between the flange portion and the outer surface of the speed reducing mechanism receiving portion, which is located around the connector installation opening.

Thus, the annularly formed flange portion is locked on the side surface of the speed reducing mechanism receiving portion with the installation opening sealing member in-between. For this reason, the installation opening sealing member in proximity to the connector installation opening is pressed by the annular flange portion. Thus, it is brought into tight contact with the side surface of the speed reducing mechanism receiving portion, and can positively seal the connector installation opening.

In the above-mentioned motor according to the present invention, the connector supporting member is preferably formed into the tubular body, which has a bottom that includes through holes for receiving the motor side terminals therethrough. A terminal sealing member is preferably provided around the motor-side terminals. Preferably, the terminal sealing member is elastically deformable and is pressed against and brought into contact with the bottom of the connector supporting member.

Thus, the terminal sealing member is pressed against and brought into contact with the bottom of the connector supporting member and can be elastically deformed. For this reason, the elastically deformed terminal sealing member is brought into tight contact with the motor-side terminals, and seals the insertion hole formed in the bottom of the connector supporting member. As a result, water drops from the interior of the connector housing can be prevented from entering the interior of the speed reducing mechanism receiving portion. Therefore, even when the vehicle goes under the water, the motor arrangement can be driven.

In the above-mentioned motor according to the present invention, the connector supporting member is preferably provided with a stopper portion(s) to be anchored to the inner surface of the speed reducing mechanism receiving portion. Thus, when the connector housing is installed in the connector installation opening, the connector housing can be positively prevented from coming off. Though the speed reducing mechanism receiving portion and the connector housing are formed separately from each other, the shape of the speed reducing mechanism receiving portion is not complicated. This is because the connector housing is prevented from coming off by forming the stopper portions on the connector housing side.

In the above-mentioned motor according to the present invention, the connector housing may include an inner panel sealing member. The inner panel sealing member may be brought into tight contact with a portion of an inner panel of a vehicle door, which is located around an insertion opening of the inner panel, so that the inner panel sealing member seals the insertion opening of the inner panel. The inner panel sealing member may be made as the same member as the installation opening sealing member.

When the inner panel sealing member and the installation opening sealing member are molded from the same member, the number of joints is reduced as compared with cases where the following is implemented: the inner panel sealing member and the installation opening sealing member are formed separately from each other, and they are respectively installed on the connector supporting member. Therefore, when they are molded from the same member, the connector housing is made excellent in water proofing property. When they are respectively installed on the connector supporting member, a detachment restraining construction must be formed between each of them and the connector supporting member. When they are molded from the same member, the detachment restraining construction is reduced in number as compared with cases where they are formed separately from each other. Therefore, the shape of the connector housing can be simplified. Since the number of parts is reduced, the labor for assembly and the production cost can be reduced.

In the motor according to the present invention, the inner panel sealing member may be molded from the same member as that of the terminal sealing member. Specifically, the inner panel sealing member may be molded integrally with the terminal sealing member.

When the inner panel sealing member and the terminal sealing member are molded from the same member, the number of parts is reduced. Therefore, the labor for assembly and the production cost can be reduced.

In the motor according to the present invention, the inner panel sealing member may be molded integrally with the connector supporting member. In this case, the labor for assembly can be reduced as compared with cases where the connector supporting member is separately molded.

In the motor according to the present invention, at least the motor arrangement and the speed reducing arrangement may be disposed outside the inner panel of a vehicle door. Further, the external connector may be so constructed that it is inserted from inside the inner panel through an insertion opening formed in the inner panel. Thus, the external connector, inserted from inside the inner panel through the insertion opening in the inner panel, can be covered with the connector housing between the inner panel and the motor.

The motor according to the present invention may be manufactured as follows. That is, the connector housing may be molded separately from the speed reducing mechanism receiving portion in such a manner that the connector housing at least includes a connector supporting member that supports the external connector relative to the speed reducing mechanism receiving portion, and an installation opening sealing member that is elastically deformable. Then, the installation opening sealing member may be interposed between the connector supporting member and an outer surface of the speed reducing mechanism receiving portion. Thereafter, the installation opening sealing member may be secured to a connector installation opening, which is formed in the speed reducing mechanism receiving portion. Thus, the motor that brings the above-mentioned action and effect can be manufactured.

BEST MODE FOR CARRYING OUT THE INVENTION

FIRST EMBODIMENT

Hereafter, a first embodiment, in which the present invention is realized in a motor 11 (power window motor) for a power window system of a vehicle, will be described with reference to FIG. 1 to FIG. 6.

Figure 1:
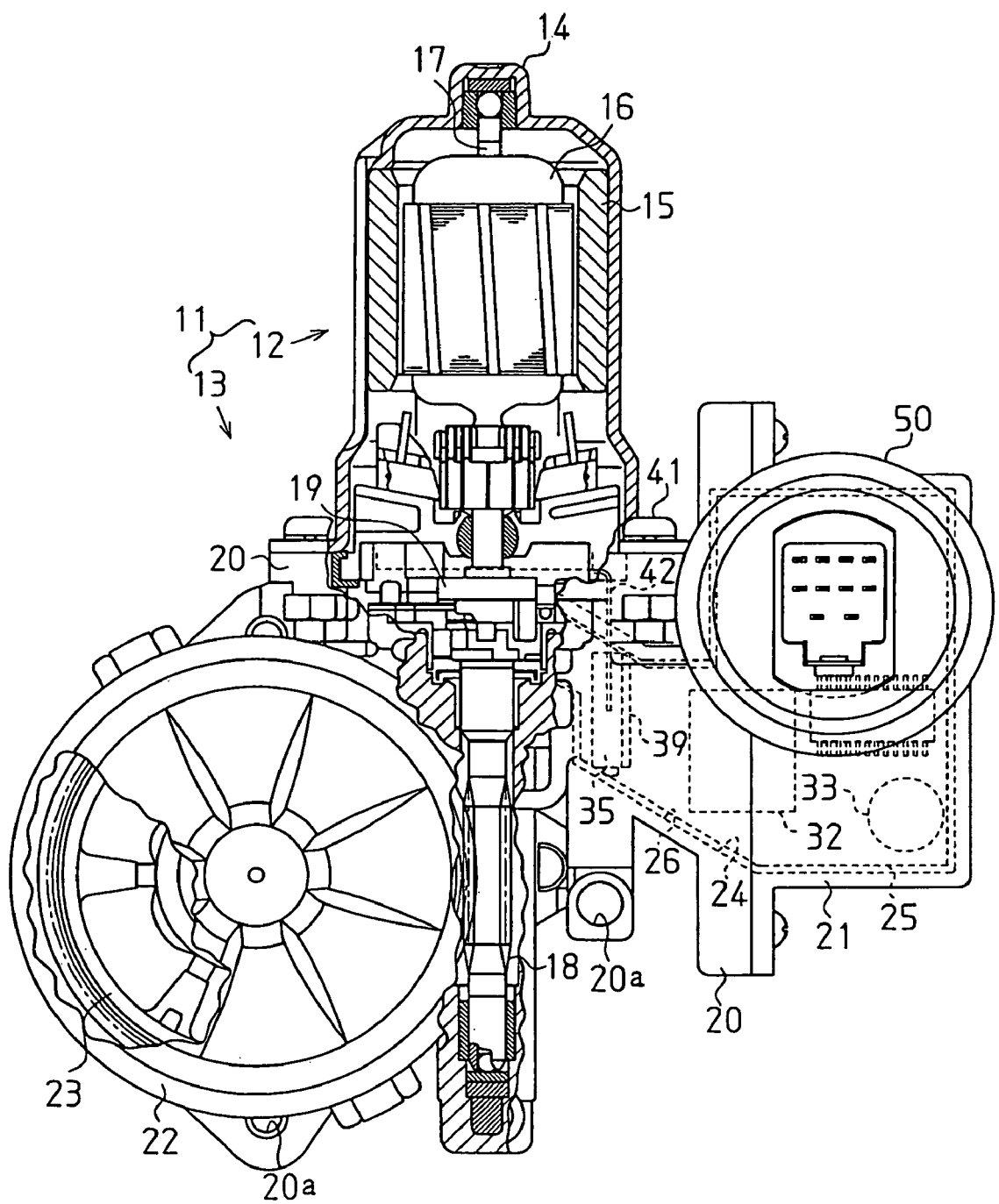
FIG. 1 is a partially sectional front view of a motor.

As illustrated in FIG. 1, the motor 11 includes a motor arrangement 12 and a speed reducing arrangement 13. The speed reducing arrangement 13 decelerates the rotation of the motor arrangement 12 and outputs it.

The motor arrangement 12 includes a yoke housing (hereinafter, simply referred to as a yoke) 14, magnets 15 and an armature 16. The yoke housing 14 is formed into a generally cylindrical body having a bottom. The magnets 15 are secured to an inner surface of the yoke 14. The armature 16 is rotatably supported by and is substantially received in the yoke 14. The armature 16 has a rotatable shaft 17, and a worm 18 is formed at a distal end of the rotatable shaft 17, which protrudes from the yoke 14. A sensor magnet 19 is fixed to an intermediated part of the rotatable shaft 17, more particularly, the portion of the rotatable shaft 17, which protrudes from the yoke 14 and is located on the yoke 14 side of the worm 18.

The speed reducing arrangement 13 includes a gear housing 20, a closing and fixing member 21 and a worm wheel 23. The gear housing 20 is made of a resin material and is fixed to an opening of the yoke 14. The worm wheel 23 is rotatably supported in a wheel receiving portion 22, which is formed in the gear housing 20. Also, the worm wheel 23 is meshed with the worm 18. The worm wheel 23 is connected to an output shaft (not shown), which is externally protruded in a direction perpendicular to the plane of FIG. 1. In this embodiment, the worm 18 and the worm wheel 23 form a speed reducing mechanism, and the gear housing 20 and the closing and fixing member 21 form a speed reducing mechanism receiving portion. The output shaft is coupled with a window glass through a regulator (not shown) or the like.

The gear housing 20 has a board receiving portion 24, which is formed on a side opposite from the wheel receiving portion 22 with respect to the worm 18. The board receiving portion 24 is provided with a guide wall 26 for guiding a control circuit board 25 described later. The guide wall 26 is formed to correspond with the shape of the control circuit board 25. The board receiving portion 24 is communicated with a board installation opening 27, which is formed at an end of the gear housing 20 in such a manner that the board installation opening 27 extends along an axial direction of the rotatable shaft 17.

Figure 2:
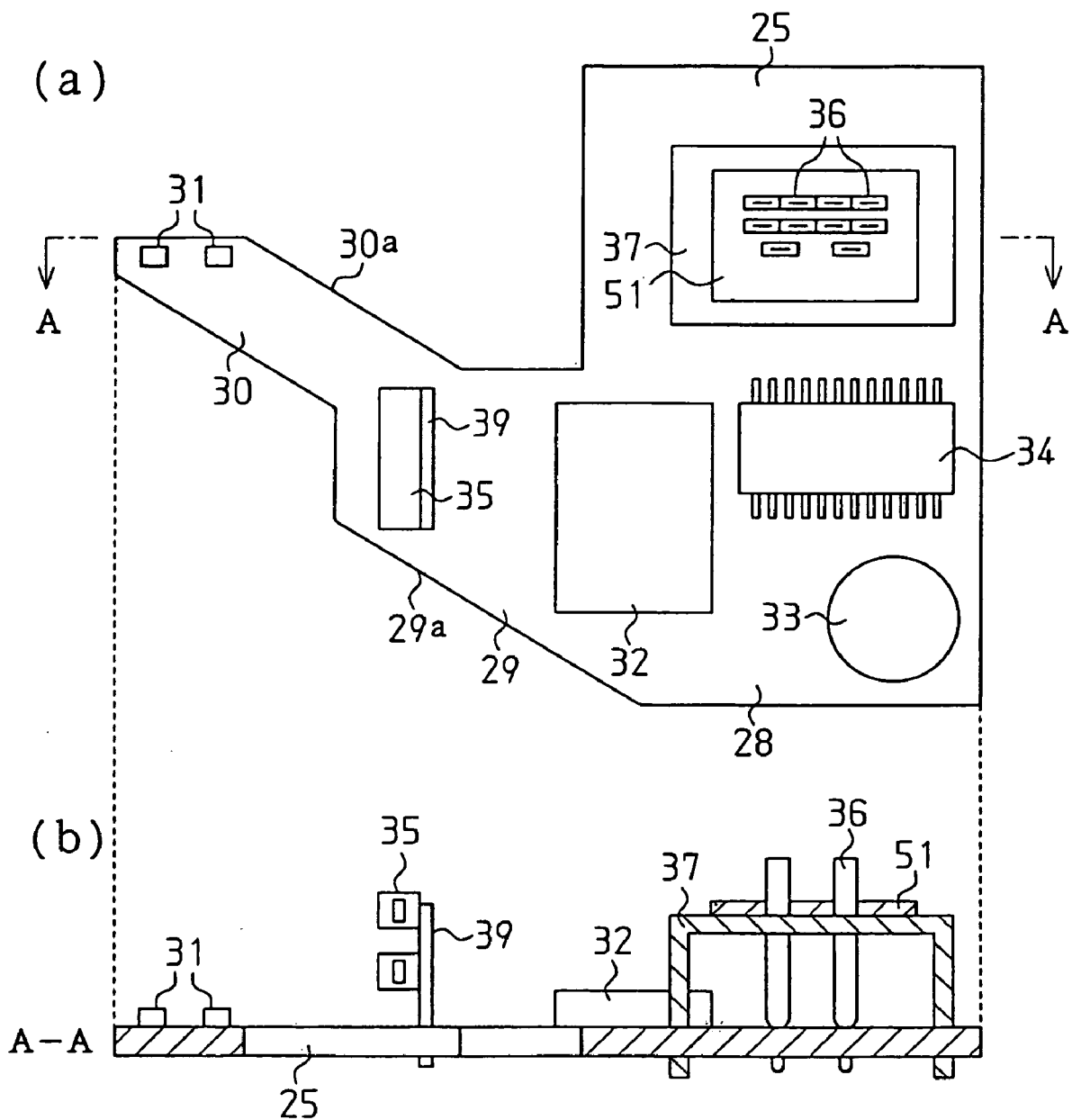
FIG. 2(a) is a front view of a control circuit board.
FIG. 2(b) is a sectional view taken along the line A-A.
Figure 3:
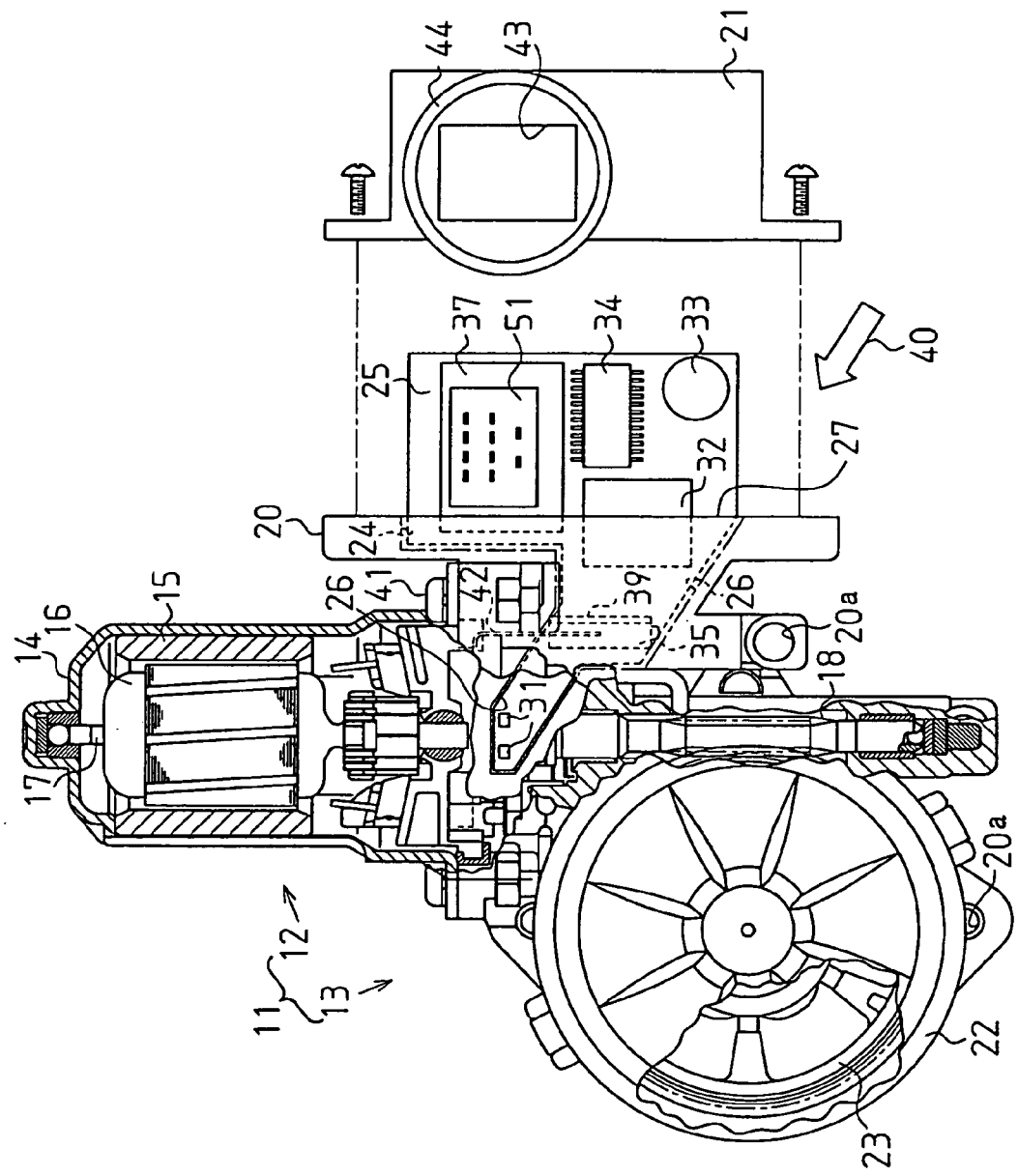
FIG. 3 is a partially sectional exploded front view of a motor.

The control circuit board 25, on which electrical circuit components are installed, is substantially received and is held in the board receiving portion 24. As illustrated in FIG. 2, the control circuit board 25 is formed into a generally V-shape. More particular description will be given. The control circuit board 25 includes first to third board parts 28 to 30. The first board part 28 is formed into a generally rectangular shape. The second board part 29 is connected to the first board part 28 and is formed into a generally trapezoidal shape. The third board part 30 is connected to the second board part 29 and is formed into a generally parallelogram shape. The entire second and third board parts 29, 30 and a portion of the first board part 28 are received in the board receiving portion 24. Therefore, the guide wall 26, which is provided in the board receiving portion 24, is configured to correspond with the shapes of the second and third board parts 29, 30. Specifically, the guide wall 26 is formed to correspond with a slant edge 30a of the third board part 30 and a slant edge 29a of the second board part 29, so that the guide wall 26 extends in a direction that defines an acute angle relative to the axial direction of the rotatable shaft 17.

The electrical circuit components mounted on the control circuit board 25 may vary according to the specifications for the motor 11. In this embodiment, as illustrated in FIG. 2(a), the electrical circuit components include Hall elements 31, a relay 32, a capacitor 33, an IC 34, brush power supply terminals 35, terminal connection terminals (serving as motor-side terminals) 36 and a connector block 37. More specifically, the relay 32, the capacitor 33, the IC 34, the terminal connection terminals 36 and the connector block 37 are mounted on the first board part 28. The brush power supply terminals 35 are mounted on the second board part 29. The Hall elements 31 are mounted on the third board part 30. The control circuit board 25 of this embodiment is provided with a so-called pinching limiting control circuit. The rotational speed of the sensor magnet 19 (the rotatable shaft 17) is detected with the Hall elements 31. When the IC 34 determines that pinching of an object by a window glass of the vehicle has occurred based on the detected rotational speed, the pinching limiting control circuit supplies a reverse rotation electric current to the motor arrangement 12.

As illustrated FIG. 2(b), the terminal connection terminals 36 are installed to a corresponding location of the control circuit board 25 in a direction perpendicular to the control circuit board 25. The number and positions of the terminal connection terminals 36 may vary according to the specifications for the motor 11. In this embodiment, as illustrated in FIG. 2(a), eight terminal connection terminals 36 are arranged in two rows, four in each row, and another two are disposed in front of them.

The terminal connection terminals 36 are supported in the connector block 37 in such a manner that the terminal connection terminals 36 extend in the direction perpendicular to the control circuit board 25. The connector block 37 is a rectangular plate having four legs. Through holes are provided in the connector block 37 at positions, which correspond to the positions of the terminal connection terminals 36, so that the terminal connection terminals 36 are inserted and supported in the holes.

The terminal connection terminals 36 thus installed on the control circuit board 25 are connected to the brush power supply terminals 35 through the control circuit board 25. The number of the brush power supply terminals 35 is two, and the two brush power supply terminals 35 are disposed one after the other along a line, which is perpendicular to the control circuit board 25, as illustrated in FIG. 2(b). More particularly, a support board 39, which extends in the direction perpendicular to the control circuit board 25, is provided to the control circuit board 25. The brush power supply terminals 35 are installed to the support board 39, and as a result, the two brush power supply terminals 35 are disposed one after the other along the line, which extends perpendicular to the control circuit board 25.

When the control circuit board 25, to which the electrical circuit components are installed, is substantially received in the board receiving portion 24, a portion of the control circuit board 25 protrudes from the end (i.e., the board installation opening 27). The closing and fixing member 21 is fixed (screwed), so that this protruded portion of the control circuit board 25 is covered by the closing and fixing member 21, and the board installation opening 27 of the board receiving portion 24 of the gear housing 20 is closed by the closing and fixing member 21. In this embodiment, first, the control circuit board 25 is inserted into the board receiving portion 24 along the guide wall 26 of the board receiving portion 24, i.e., is inserted along the direction (inclined direction), which defines the acute angle relative to the axial direction of the rotatable shaft 17, as indicated by an arrow 40 in FIG. 3. Then, the closing and fixing member 21 is fixed to the gear housing 20. Subsequently, the motor arrangement 12 is assembled to the gear housing 20 with screws 41. At this time, the brush power supply terminals 35, which are installed to the second board part 29, are connected to brush-side terminals 42, which protrude from the motor arrangement 12 to supply electric power to the motor arrangement 12. The Hall elements 31, which are installed to the third board part 30, are arranged to oppose the sensor magnet 19.

The closing and fixing member 21, which is fixed to the gear housing 20, is formed into a rectangular tubular body that has a rectangular cross section and a bottom. A connector installation opening 43 is formed in a side surface of the closing and fixing member 21, which faces in a direction perpendicular to the axis of the rotatable shaft 17 (i.e., the direction perpendicular to the plane of FIG. 1 or 3). The connector installation opening 43 is formed in a position, which corresponds to the terminal connection terminals 36 mounted on the control circuit board 25. Therefore, when the connector installation opening 43 is viewed from the direction perpendicular to the plane of FIG. 1, the terminal connection terminals 36 are exposed from the connector installation opening 43. The terminal connection terminals 36 are formed such that longitudinal distal ends of the terminal connection terminals 36 do not protrude from the connector installation opening 43. That is, after installation of the control circuit board 25 into the gear housing 20, the closing and fixing member 21 is installed to the gear housing 20. Thus, interference between the distal ends of the terminal connection terminals 36 and the closing and fixing member 21 is prevented. Furthermore, a positioning base 44, which is formed generally into a cylindrical body having a bottom, is formed around the connector installation opening 43.

Figure 4:
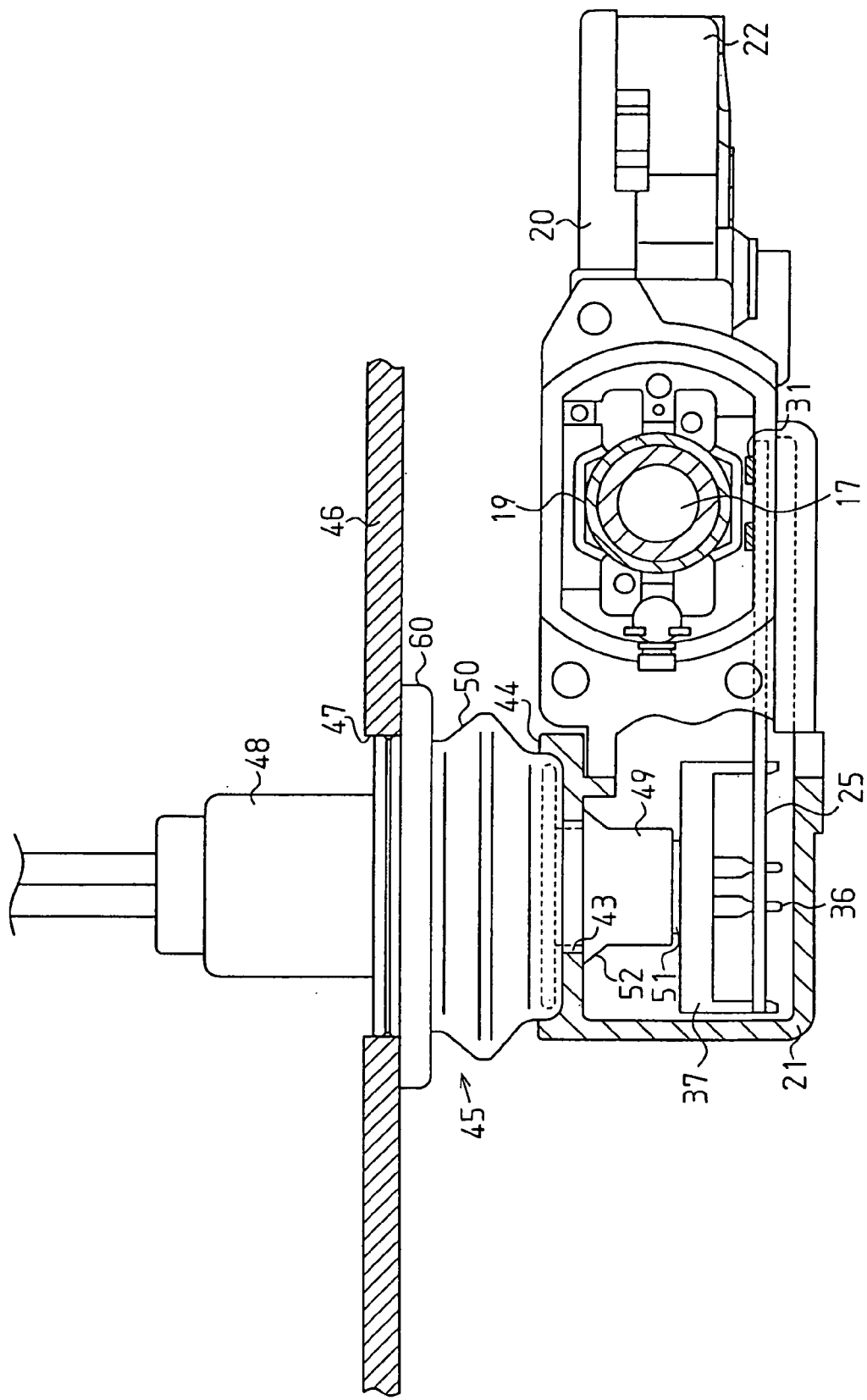
FIG. 4 is a partially sectional side view of a motor.

As illustrated in FIG. 4, a connector housing 45 is installed to the connector installation opening 43. The connector housing 45 is formed in such a manner that an external connector 48 is engageable from an inner side of an inner panel 46 of the vehicle door to the connector housing 45 through an insertion opening 47 formed in the inner panel 46. That is, the connector housing 45 is disposed such that the connector housing 45 is held between the gear housing 20 and the inner panel 46. The motor 11 of the present embodiment is arranged at an outer side of the inner panel 46 in such a manner that mounting portions 20a of the gear housing 20 of the motor 11 are secured to the inner panel 46 by fixing members (not shown).

Figure 5:
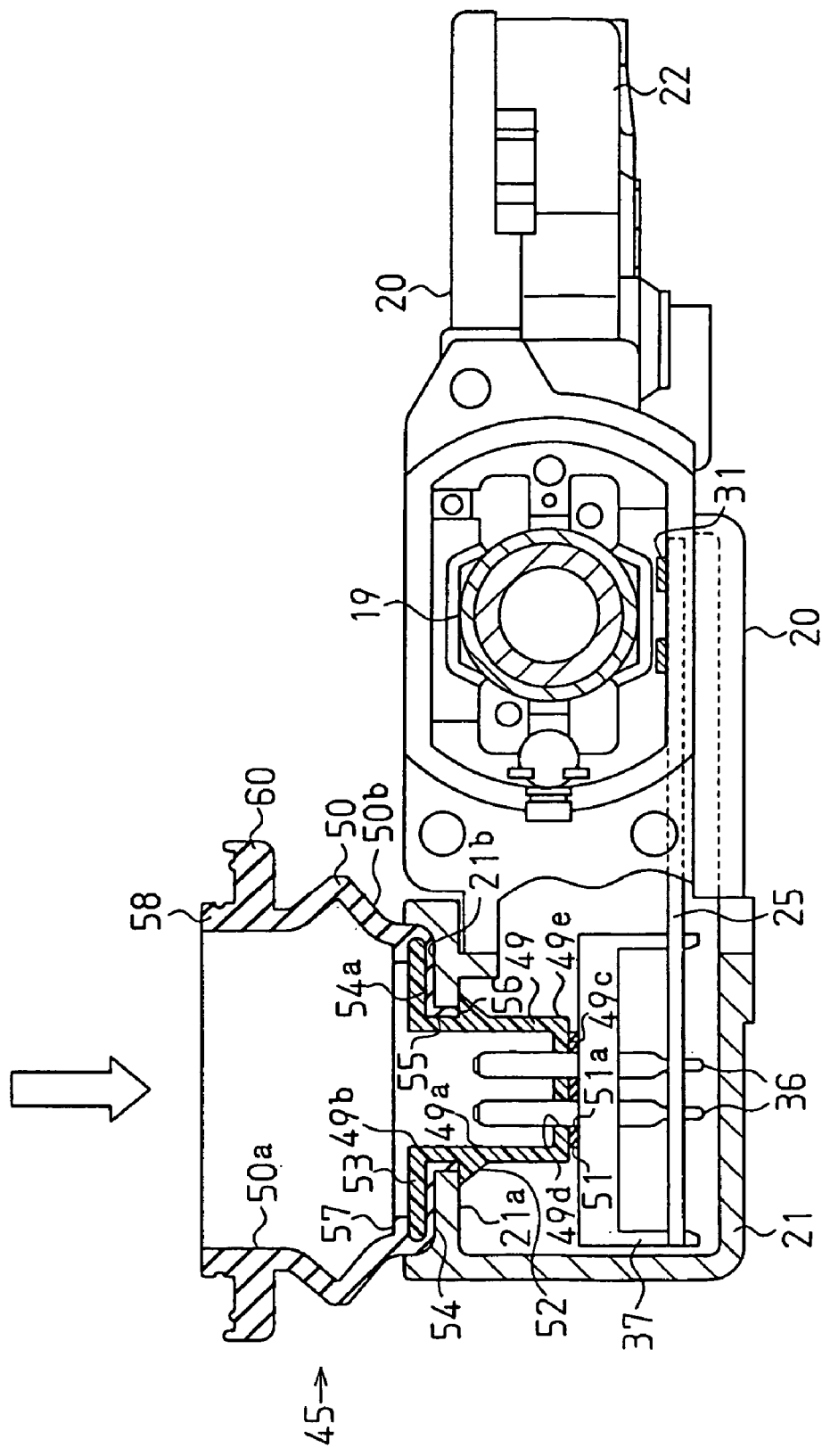
FIG. 5 is a sectional side view of a connector housing.
Figure 6:
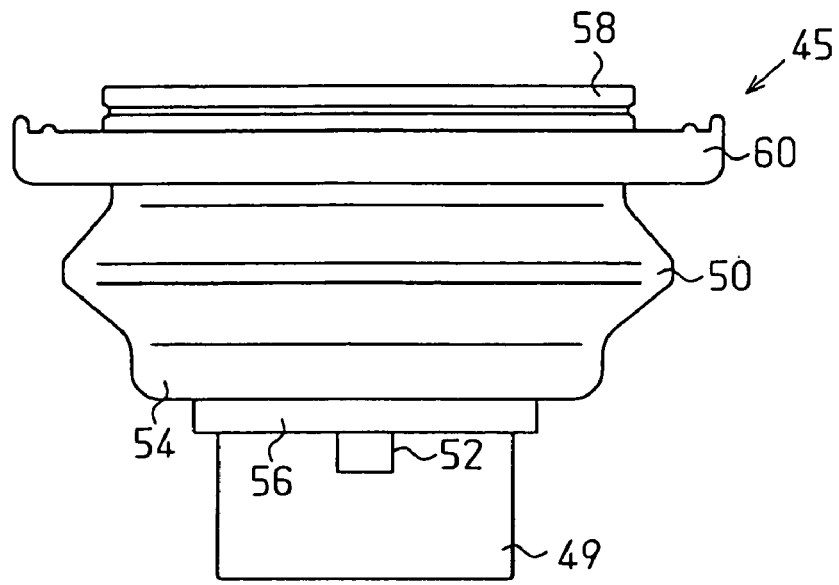
FIG. 6(a) is a side view of a connector housing.
FIG. 6(b) is a bottom view of the connector housing.
Figure 6:
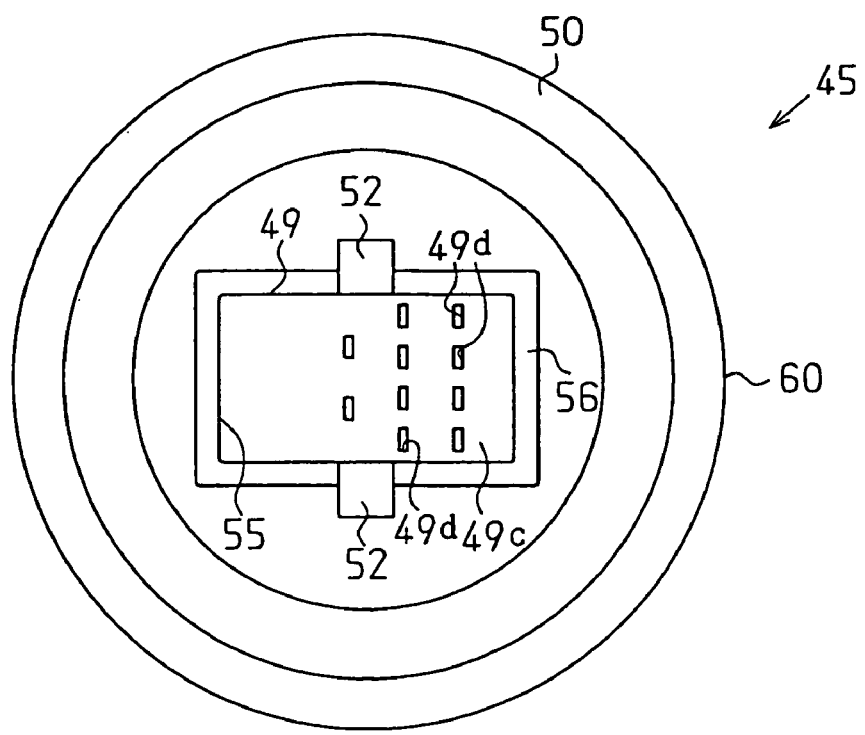

As illustrated in FIG. 5 and FIGS. 6(a) and 6(b), the connector housing 45 includes a retainer 49 and a grommet 50. The external connector 48 is fitted to the retainer 49, and the retainer 49 supports the external connector 48 relative to the gear housing 20. The grommet 50 seals the insertion opening 47 of the inner panel 46 and the connector installation opening 43 of the closing and fixing member 21. The retainer 49 functions as a connector supporting member. The grommet 50 functions as an inner panel sealing member and an installation opening sealing member.

The retainer 49 is made of a resin material and is formed into a rectangular tubular body, which has a rectangular cross section and a bottom. The shape of the inner peripheral surface 49a of the retainer 49 corresponds to the shape of the external connector 48 to allow insertion of the external connector 48 through an opening 49b of the retainer 49 and thereafter to connect the external connector 48 to the retainer 49.

Through holes 49d are formed in a bottom 49c of the retainer 49 in such a manner that the terminal connection terminals 36, which project from the control circuit board 25, are inserted through the through holes 49d. The terminal connection terminals 36 are inserted through the through holes 49d, and the distal ends of the terminal connection terminals 36 protrude into the interior of the retainer 49. The external connector 48, which is fitted to the retainer 49, is connected to the terminal connection terminals 36. It should be understood that the through holes 49d are formed to correspond with the positions and number of the terminal connection terminals 36.

A thin sealing plate 51, which is formed of an elastic member (e.g. elastomer), is interposed between the bottom 49c of the retainer 49 and the connector block 37 installed on the control circuit board 25. The sealing plate 51 functions as a terminal sealing member. Through holes 51a, through which the terminal connection terminals 36 are inserted, are also formed in the sealing plate 51, and the terminal connection terminals 36 are inserted into the through holes 51a. The sealing plate 51 is pressed and elastically deformed by the bottom 49c of the retainer 49 and the connector block 37, so that the sealing plate 51 is brought into tight contact with the area around the terminal connection terminals 36. That is, the sealing plate 51 seals a respective gap formed between each through hole 49d of the retainer 49 and the corresponding terminal connection terminal 36 to limit intrusion of water from the interior of the retainer 49 into an interior of the gear housing 20.

Fixing claws 52 are formed at predetermined positions of an outer peripheral surface 49e of the retainer 49 and protrude from the outer peripheral surface 49e of the retainer 49. The fixing claws 52 serve as stopper portions, which are anchored to the inner surface 21a of the closing and fixing member 21. The positions of the fixing claws 52 are set such that when the connector housing 45 is assembled to the connector installation opening 43, a distance between the fixing claws 52 and the bottom 49c of the retainer 49 is substantially equal to a distance between the connector block 37 and an opposed portion of the inner surface 21a of the closing and fixing member 21. In other words, the positions of the fixing claws 52 are set such that when the bottom 49c of the retainer 49 presses the sealing plate 51, the fixing claws 52 are engaged with the inner surface 21a of the closing and fixing member 21, and the bottom 49c keeps the pressing of the sealing plate 51. The fixing claws 52 are so formed that they are sloped and widened as it goes closer to the inner surface 21a of the closing and fixing member 21. That is, the fixing claws 52 are so formed that they are widened as it goes from the bottom 49c toward the opening 49b of the retainer 49. Therefore, when the retainer 49 is installed from outside the closing and fixing member 21, it smoothly passes through the connector installation opening 43, following the shape of the fixing claws 52.

A flange portion 53, which can be anchored against the outer surface 21b of the closing and fixing member 21, is formed on the retainer 49 at a position that is adjacent to the opening 49b of the retainer 49. The flange portion 53 is formed into an annular body, which protrudes radially outward from the opening 49b of the retainer 49. The grommet 50 is installed to the flange portion 53.

The grommet 50 is made from an elastic member (e.g., elastomer) in a form of a cylindrical body, which is configured like bellows. One end of the grommet 50 (hereafter, referred to as "retainer-side end 54") is so formed that an outer diameter of the retainer-side end 54 of the grommet 50 is substantially the same as an inner diameter of the positioning base 44. Thus, the retainer-side end 54 of the grommet 50 can be fitted into the positioning base 44 formed on the closing and fixing member 21.

A retainer installation opening 55, through which the retainer 49 is inserted, is formed at the retainer-side end 54. The retainer installation opening 55 is formed to correspond with the shape (i.e. substantially rectangular shape) of the outer peripheral surface 49e of the retainer 49. The grommet 50 is installed to the retainer 49 by inserting the bottom 49c of the retainer 49 through the retainer installation opening 55, so that the bottom 49c of the retainer 49 protrudes outward from the grommet 50.

An extended portion 56 protrudes from the retainer-side end 54 in the axial direction of the grommet 50 (the downward direction in FIG. 4 or 5), so that the extended portion 56 extends all along an edge of the retainer installation opening 55. The extended portion 56 is formed to be pressed against the outer peripheral surface 49e of the retainer 49. When the connector housing 45 is installed to the connector installation opening 43, the extended portion 56 has a thickness that is substantially equal to a distance between the outer peripheral surface 49e of the retainer 49 and the connector installation opening 43.

An annular engaging projection 57, which projects toward the center of the grommet 50, is formed in an inner peripheral surface 50a of the grommet 50. The distance between the engaging projection 57 and the retainer-side end 54 is substantially equal to the thickness of the flange portion 53 in the direction of the axis of the grommet 50 (the vertical direction in FIG. 4 or 5). Therefore, when the retainer 49 is inserted through the retainer installation opening 55, and the flange portion 53 is brought into contact with an inner surface 54a of the retainer-side end 54, the flange portion 53 is held between the engaging projection 57 and the inner surface 54a of the retainer-side end 54. In other words, the flange portion 53 is inserted between the engaging projection 57 and the inner surface 54a of the retainer-side end 54. The flange portion 53 can be easily fitted between the engaging projection 57 and the inner surface 54a of the retainer-side end 54 by elastically deforming the grommet 50.

As illustrated in FIG. 5, the flange portion 53 of the retainer 49 is anchored to the outer surface 21b (more specifically, the positioning base 44 formed around the connector installation opening 43) through the retainer-side end 54. At this time, a distance between the fixing claws 52 formed on the retainer 49 and the flange portion 53 in the axial direction of the grommet 50 (vertical direction in FIG. 4) is slightly smaller than the total wall thickness of the closing and fixing member 21 and the retainer-side end 54 of the grommet 50. For this reason, when the connector housing 45 is installed to the connector installation opening 43, the side surface of the closing and fixing member 21 and the retainer-side end 54 are held between the fixing claws 52 and the flange portion 53. In addition, since the grommet 50 is held between the inner panel 46 and the motor 11, the grommet 50 presses the outer surface 21b of the closing and fixing member 21 by the retainer-side end 54.

For this reason, the retainer-side end 54 of the grommet 50 is pressed against and brought into contact with the outer surface 21b located around the connector installation opening 43. Since the grommet 50 is the elastic member, the retainer-side end 54 is brought into tight contact with the outer surface 21b of the closing and fixing member 21. That is, the retainer-side end 54 functions as an installation opening sealing member and seals a gap between the retainer 49 and the connector installation opening 43.

The other end (hereafter, referred to as "inner panel-side end 58) of the grommet 50, which is located on the side opposite to the retainer-side end 54 in the axial direction, is constructed to fit into the insertion opening 47 of the inner panel 46. Specifically, an outer diameter of the inner panel-side end 58 is slightly smaller than an inner diameter of the insertion opening 47 of the inner panel 46, so that the inner panel-side end 58 can be fitted into the insertion opening 47 of the inner panel 46. A flange portion 60 is formed to radially outwardly project from the outer peripheral surface 50b of the grommet 50 at a position that is spaced a predetermined distance from the inner panel side end 58. The flange portion 60 is pressed against and brought into contact with the inner panel 46, so that the flange portion 60 seals the insertion opening 47 of the inner panel 46.

Therefore, when the motor 11 is assembled to the inner panel 46, the inner panel-side end 58 of the grommet 50 is fitted into the insertion opening 47 of the inner panel 46. As a result, the flange portion 60 is pressed against and brought into contact with the inner panel 46 around the insertion opening 47, and thus the insertion opening 47 of the inner panel 46 is sealed.

The motor 11 constructed in the manner mentioned above operates as follows. A drive electric current is supplied from an undepicted control device (a power supply device) to the armature 16 through the external connector 48, the terminal connection terminals 36, the brush power supply terminals 35 and the brush-side terminals 42, so that the armature 16 is rotated. Consequently, the worm wheel 23 and the output shaft are rotated in response to the rotation of the rotatable shaft 17. The resulting torque is converted into linear motion by the regulator or the like to raise or lower the window glass. At this time, in the motor 11, the rotational speed of the sensor magnet 19 (the rotatable shaft 17) is detected with the Hall elements 31. At the time of raising the window glass, when the IC 34 determines that an object is pinched by the window glass of the vehicle based on the measured rotational speed of the sensor magnet 19, a reverse rotational electric current is supplied to the motor arrangement 12, so that the window glass is lowered to limit the pinching of the object.

As mentioned above, this embodiment provides the following advantages.

(1) The flange portion 53 is formed on the retainer 49. Thus, when the connector housing 45 is attached to the connector installation opening 43, the retainer-side end 54 of the grommet 50 is interposed between the flange portion 53 and the outer surface 21b of the closing and fixing member 21. Since the retainer-side end 54 of the grommet 50 is the elastic member, the retainer-side end 54 is pressed against and brought into contact with the outer surface 21b of the closing and fixing member 21 by the flange portion 53. The retainer-side end 54 is brought into tight contact with the outer surface 21b and seals the connector installation opening 43. For this reason, recesses or projections need not be formed on the outer peripheral surface 49e of the retainer 49 or the inner peripheral surface 50a of the grommet 50. These recesses or projections are for pressing the outer peripheral surface 49e of the retainer 49 and thereby providing sealing when the grommet 50 is fitted into the retainer 49.

Therefore, it is possible to reduce the number of portions in undercut shape, such as sealing projections formed on the outer peripheral surface 49e of the retainer 49, in the outside shape of the retainer 49, and simplify the shape. With respect to the grommet 50, similarly, it is possible to eliminate sealing recesses and projections and reduce the number of portions in undercut shape, and simplify the shape as compared with conventional cases.

Thus, the retainer 49 and the grommet 50 can be formed in simple shape; therefore, the constitution of metal molds and the like for molding is simplified, and the production cost can be reduced.

(2) To assemble the grommet 50 to the retainer 49, the engaging projection 57 that locks the flange portion 53 of the retainer 49 is formed on the inner peripheral surface 50a of the grommet 50. This engaging projection 57 is intrinsically formed in undercut shape. However, since the grommet 50 is formed of an elastic member, such as elastomer, that can be elastically deformed with ease, the following advantage is brought: the grommet 50 can be released from a metal mold by elastically deforming it without performing undercut processing using a slide core or the like. Therefore, molding of the whole of the connector housing 45 can be facilitated, and the production cost can be reduced.

(3) The areas to be sealed are pressed in the direction of the axis of the grommet 50, and the grommet 50 or the sealing plate 51 is thereby elastically deformed. As a result, these areas are sealed. (Such areas to be sealed include the boundary between the inner panel 46 and the grommet 50, the boundary between the grommet 50 and the closing and fixing member 21, and the boundary between the bottom 49c of the retainer 49 and the connector block 37.) The distance between the inner panel 46 and the motor 11 is adjustable. For this reason, force applied to sealed areas can be enhanced by reducing the distance between the inner panel 46 and the motor 11. Thus, the insertion opening 47 in the inner panel 46, the connector installation opening 43, and the through holes 49d in the retainer can be positively sealed. Therefore, the shapes of the retainer 49 and the grommet 50 can be simplified, and positive sealing can be provided without strictly maintaining the shapes of the retainer 49 and the grommet 50 during molding.

(4) The connector housing 45 is formed separately from the gear housing 20 and the like, and the connector housing 45 is attached through the connector installation opening 43. As a result, the distal ends of the terminal connection terminals 36 on the control circuit board 25 are protruded inside the connector housing 45, and they can be connected with the external connector 48. Therefore, for example, motors 11 different in the shape of external connector 48 according to various specifications can be obtained only by changing the connector housing 45. The control circuit board 25, gear housing 20, and the like are used as common components. In addition, with respect to this motor 11, the motor arrangement 12, gear housing 20, and the like can be managed as an integral article before the connector housing 45 is assembled, for example, before the specifications for the connector housing 45 are established. Thus, the parts management is facilitated. Therefore, the motor 11 can meet the requirements of various specifications for external connectors 48 different in shape at low cost.

(5) The retainer 49 is provided on its outer peripheral surface 49e with the fixing claws 52 to be locked to the inner surface 21a of the closing and fixing member 21. For this reason, the necessity for a construction for assembling the retainer 49 to the closing and fixing member 21, for example, a detachment restraining construction, such as a groove to be engaged with the fixing claws 52 of the retainer 49, is obviated. As a result, the shape of the closing and fixing member 21 is simplified, and molding of the closing and fixing member 21 is facilitated.

(6) The distance between the fixing claws 52 and the flange portion 53 of the retainer 49 is made slightly smaller than the total thickness of the closing and fixing member 21 and the retainer-side end 54 of the grommet 50. For this reason, the flange portion 53 and the fixing claws 52 sandwich the closing and fixing member 21 and the retainer-side end 54 between them just by attaching the connector housing 45 to the connector installation opening 43. Therefore, the retainer-side end 54 is brought into tight contact with the outer surface 21b of the closing and fixing member 21 just by attaching the connector housing 45 to the connector installation opening 43. Consequently, the connector installation opening 43 can be positively sealed. Similarly, the distance between the fixing claws 52 and the bottom 49c of the retainer 49 is made substantially equal to the distance between the inner surface 21a of the closing and fixing member 21 to which the fixing claws 52 are locked and the connector block 37. Therefore, the sealing plate 51 interposed between the connector block 37 and the bottom 49c of the retainer 49 is pressed just by attaching the connector housing 45 to the connector installation opening 43. As a result, the sealing plate is brought into tight contact with the area around the terminal connection terminals 36. Therefore, the through holes 49d in the bottom 49c of the retainer 49 can be positively sealed.

(7) The fixing claws 52 are so formed that they are sloped and widened as it goes from the bottom 49c of the retainer 49 toward the opening 49b in the retainer 49. For this reason, when the connector housing 45 is inserted into the connector installation opening 43, the fixing claws 52 are not locked to the outer surface 21b of the closing and fixing member 21 because of their shape. Therefore, attachment of the connector housing 45 to the connector installation opening 43 is facilitated.

(8) The insertion opening 47 in the inner panel 46 is sealed with the inner panel-side end 58 of the grommet 50, and the connector installation opening 43 is sealed with the retainer-side end 54 of the grommet 50. As mentioned above, the external connector 48 is made waterproof between the inner panel 46 and the motor 11 by the grommet 50 as an integral article. Therefore, the number of joints is reduced as compared with cases where the insertion opening 47 in the inner panel 46 and the connector installation opening 43 are respectively sealed with different parts, and the water proofing property is accordingly enhanced. Since the joints are small in number, it is accordingly unnecessary to form a detachment restraining construction and a dripproof structure. As a result, the shape of the connector housing 45 can be simplified. Since the grommet 50 that seals the insertion opening 47 in the inner panel 46 and the connector installation opening 43 in the closing and fixing member 21 is formed of one item, the number of components can be reduced.

(9) The gear housing 20 is provided with the board receiving portion 24 so that the control circuit board 25 can be housed in the board receiving portion 24 by inserting the control circuit board 25 through the board installation opening 27. Therefore, the electrical circuit components mounted on the control circuit board 25 can be changed according to the specifications for the motor 11 without changing the shape of the gear housing 20 that is a relatively large component. As a result, the production cost of the entire motor 11 can be reduced.

(10) The closing and fixing member 21 is provided with the connector installation opening 43, and the connector housing 45 is fixed to the connector installation opening 43. For this reason, the orientation in which the connector housing 45 is attached can be changed according to specifications for the motor 11 without changing the shape of the gear housing 20 that is a relatively large member. This is done by changing the orientation in which the connector installation opening 43 formed in the closing and fixing member 21 is open. Therefore, the production cost of the entire motor 11 can be reduced.

(11) The two brush power supply terminals 35 mounted on the control circuit board 25 are arranged in line in the direction orthogonal to the board. Thus, the width of the control circuit board 25 in the direction orthogonal to the rotatable shaft 17 can be reduced, and the width of the motor 11 in the direction orthogonal to the rotatable shaft 17 can be reduced.

(12) Only the components that must be disposed on the motor 11 in predetermined positions, for example, the brush power supply terminals 35, the Hall elements 31, and the like are disposed deep in the board receiving portion 24. To attain this, the control circuit board is formed substantially in V shape, and the interference between the screws 41 for fixing the motor arrangement 12 to the gear housing 20 and the control circuit board 25 is eliminated. For this reason, the size of the motor 11 in the direction of the rotatable shaft 17 can be reduced.

(13) The gear housing 20 is provided with the board receiving portion 24. Thus, the control circuit board 25 can be inserted through the board installation opening 27 along the direction of its plane with the worm wheel 23 and the like housed in the gear housing 20. For this reason, motors 11 different in the electrical circuit components mounted on the control circuit board 25 can be obtained by changing the control circuit board 25 with the worm wheel 23 and the like housed. The gear housing 20 and the like are used as common components. The board installation opening 27 provided for inserting the control circuit board 25 is closed with the closing and fixing member 21 fixed to the gear housing 20. Therefore, water drops are positively prevented from entering the inside of the gear housing 20 from the outside.

(14) The board receiving portion 24 is provided with the guide wall 26 that guides the inserted control circuit board 25 in the direction of insertion. For this reason, even when the control circuit board is formed substantially in V shape, as in this embodiment, the guide wall 26 guides the control circuit board 25 in the direction of insertion. As a result, the control circuit board 25 can be smoothly housed in the board receiving portion 24.

(15) The sealing plate 51 is interposed between the bottom 49c of the retainer 49 and the connector block 37, and the sealing plate 51 is pressed by the bottom 49c of the retainer 49. The sealing plate 51 is elastically deformed and is brought into tight contact with the terminal connection terminals 36, inserted through the through holes 51a in the sealing plate 51. The through holes 49d formed in the bottom 49c of the retainer 49 are thereby sealed. For this reason, water drops from the interior of the connector housing 45 can be prevented from entering the interior of the gear housing 20. Therefore, the motor arrangement 12 can be driven to open or close window glass even after the vehicle goes under the water, for example.

SECOND EMBODIMENT

Hereafter, description will be given to a second embodiment in which the present invention is implemented. Structures, which are similar to those of the first embodiment, will not be described and depicted for the sake of simplicity.

Figure 7:
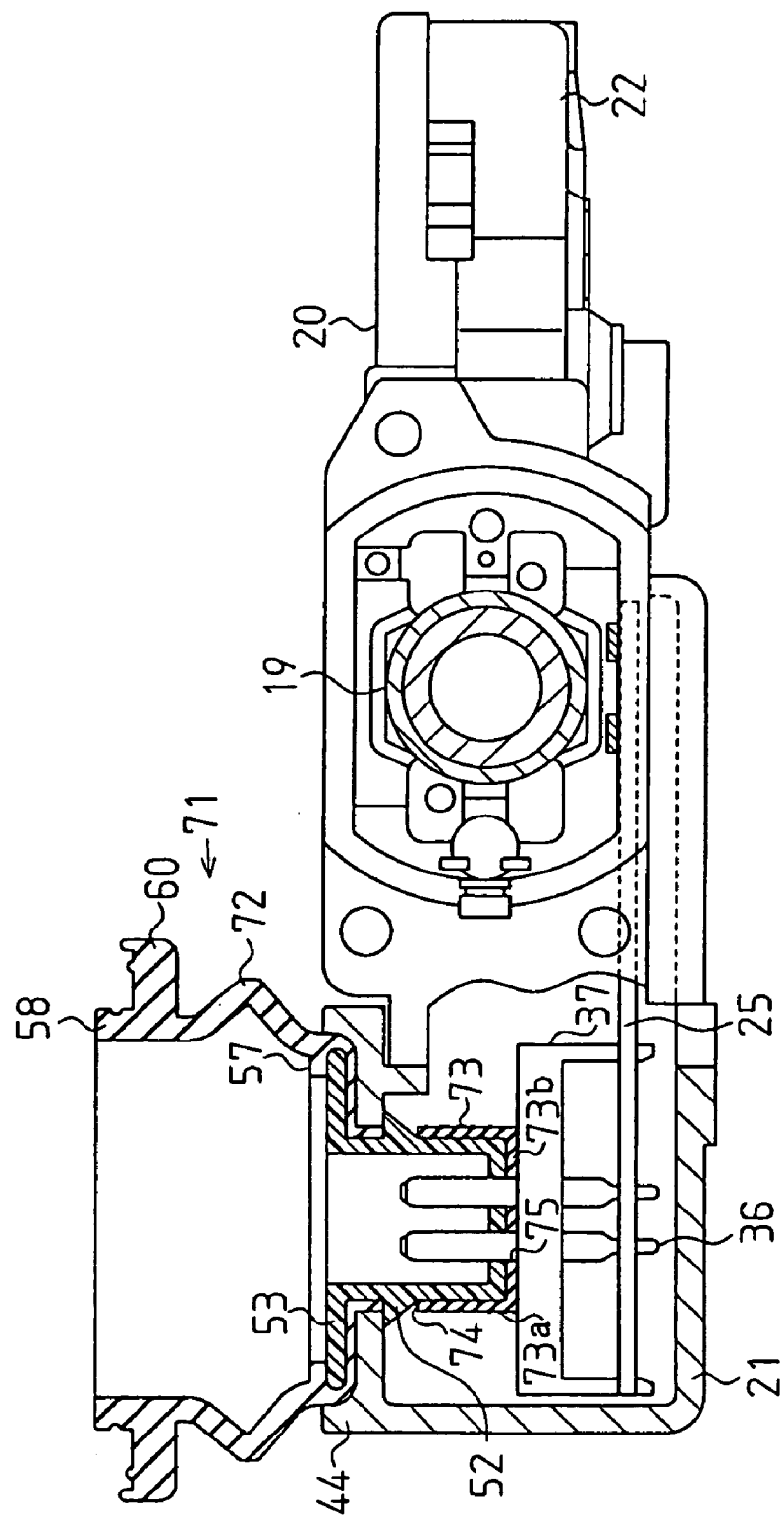
FIG. 7 is a sectional side view of a connector housing in a second embodiment.

As illustrated in FIG. 7, a connector housing 71 of the second embodiment is installed to the connector installation opening 43. The connector housing 71 is so formed that the external connector 48 can be fitted from inside the inner panel 46 of the vehicle door through the insertion opening 47 formed in the inner panel 46.

The connector housing 71 includes the retainer 49 and a grommet 72. The external connector 48 is fitted into the retainer 49. The grommet 72 covers the outer peripheral surface 49e of the retainer 49 and seals the insertion opening 47 of the inner panel 46, the connector installation opening 43 and the through holes 49d formed in the bottom 49c of the retainer 49.

The shape of the retainer 49 is the same as that of the first embodiment, so that, the detailed description of the retainer 49 will be eliminated for the sake of simplicity.

Figure 8:
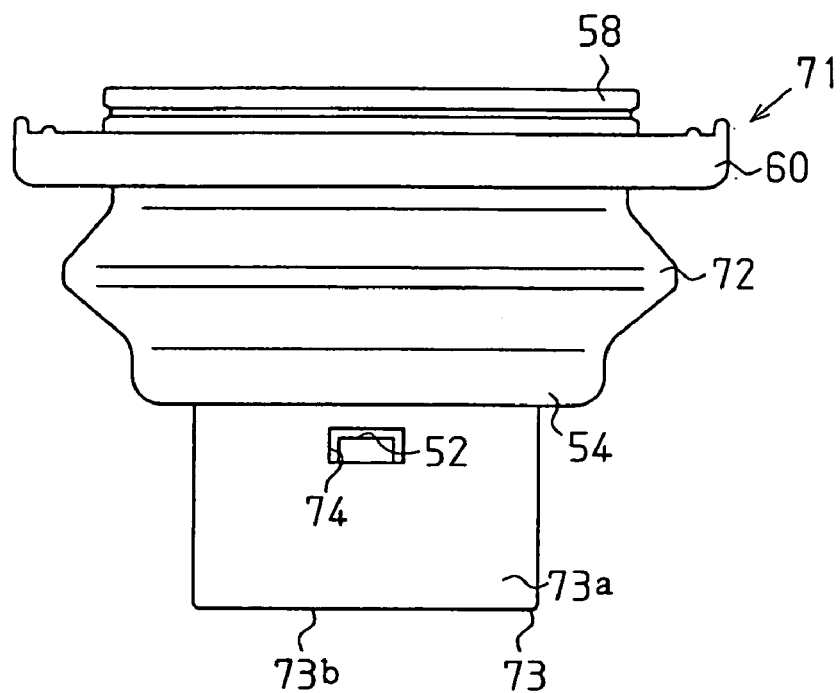
FIG. 8(a) is a side view of a connector housing in the second embodiment.
FIG. 8(b) is a bottom view of a connector housing in the second embodiment.
Figure 8:
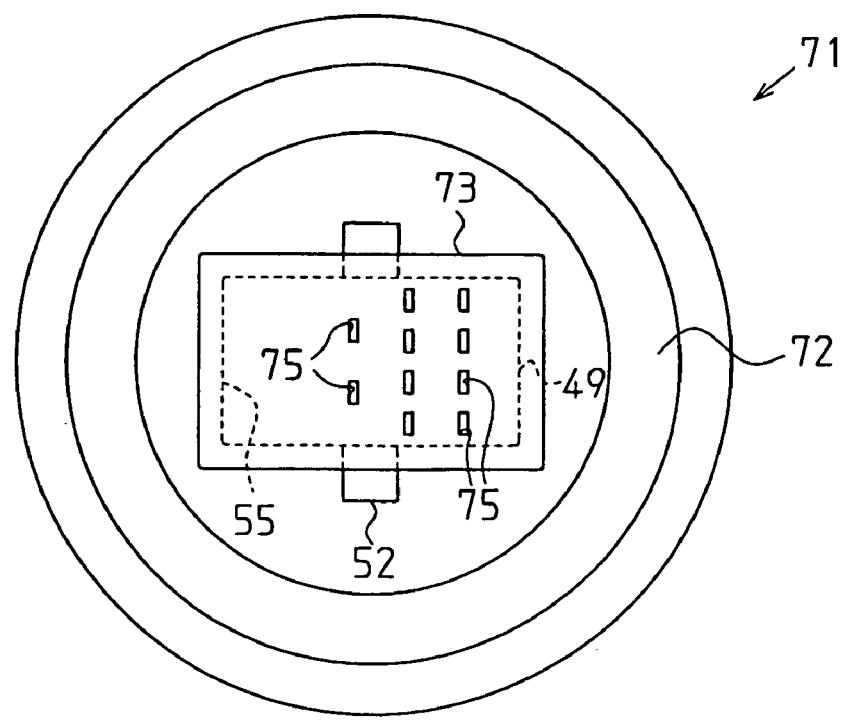

As illustrated in FIG. 8(a) and FIG. 8(b), a covering portion 73 substantially covers the outer peripheral surface 49e of the retainer 49 from the edge of the retainer installation opening 55 formed in the grommet 72. The covering portion 73 is formed of the same member as that of the grommet 72 together with the grommet 72. The grommet 72 and the covering portion 73 are simultaneously formed by injection molding. That is, the covering portion 73 is formed substantially into a rectangular tubular body, which has a rectangular cross section and a bottom. Insertion holes 74 are formed in the outer peripheral surface 73a of the covering portion 73 in predetermined positions so that the fixing claws 52 formed on the retainer 49 can be protruded through the holes 74. Through holes 75, into which the terminal connection terminals 36 are inserted, are formed in the bottom 73b of the covering portion 73 in the positions, which correspond to the through holes 49d formed in the bottom 49c of the retainer 49.

The connector housing 45, which includes the grommet 72 and retainer 49, is integrally molded by the following procedure. That is, the retainer 49 is molded with a metal mold, and the grommet 72 is formed thereon, so that the outer peripheral surface 49e of the retainer 49 is covered with the grommet 72, as mentioned above.

When this connector housing 71 is installed to the connector installation opening 43, the bottom 73b of the covering portion 73 is interposed between the bottom 49c of the retainer 49 and the connector block 37. Thus, the bottom 73b of the covering portion 73 is pressed by the bottom 49c of the retainer 49. Since the covering portion 73 is made from the elastic member, the covering portion 73 is elastically deformed when the covering portion 73 is pressed. As a result, the covering portion 73 is brought into tight contact with the area around the terminal connection terminals 36 inserted through the through holes 75 formed in the covering portion 73. That is, the covering portion 73 functions as a terminal sealing member and seals the through holes 49d formed in the bottom 49c of the retainer 49.

As mentioned in detail above, the present embodiment provides the following advantages.

(1) The bottom 49c of the retainer 49 is substantially covered with the covering portion 73. For this reason, when the connector housing 45 is attached to the connector installation opening 43, the bottom of the covering portion 73 is pressed by the bottom 49c of the retainer 49 and the connector block 37, and is elastically deformed. The covering portion 73 is brought into tight contact with the area around the terminal connection terminals 36 inserted through the through holes in the covering portion 73, and seals the through holes 49d formed in the retainer 49. That is, the grommet 72 seals the through holes 49d in the retainer 49 as well as the insertion opening 47 in the inner panel 46 and the connector installation opening 43. Therefore, it is unnecessary to form a member for sealing the through holes 49d in the retainer 49 separately from the grommet 72, and the number of components can be reduced. Consequently, the production cost of the motor can be reduced.

(2) After the retainer 49 is molded, the grommet 72 is integrally molded by injection molding so that the outer peripheral surface 49e of the retainer 49 is covered therewith. Therefore, the time and effort to attach the grommet 72 to the retainer 49 can be saved.

(3) The bottom 49c of the retainer 49 is covered with an elastic member. Therefore, it is unnecessary to take the following procedure: the member for sealing the through holes 49d formed in the bottom 49c of the retainer is disposed between the bottom 49c of the retainer 49 and the connector block 37, and then the connector housing 45 is attached to the connector installation opening 43. Therefore, assembly of the motor 11 is facilitated.

In addition to the foregoing, the present invention can be realized in the following manner.

In the above embodiments, the elastomer is cited as an example of the elastic material for constructing the grommet 50 and 72. Instead, rubber, viscous material, or the like may be used. Similarly, the sealing plate 51 may be constructed of rubber, viscous material, or the like.

In the above embodiments, the connector installation opening 43 is formed in the closing and fixing member 21. Instead, the connector installation opening 43 may be formed in the gear housing 20.

In the above embodiments, the connector installation opening 43 formed in the closing and fixing member 21 is so formed that it is open in the direction perpendicular to the axial direction of the rotatable shaft 17. Instead, it may be so formed that it is open in any other direction, for example, in the axial direction of the rotatable shaft 17, according to the specifications for the motor 11.

The electrical circuit components mounted on the control circuit board 25 in the above embodiments may be changed according to the specifications for the motor 11.

The above embodiments use the sealing plate 51 and the covering portion 73. Instead, sealing material may be separately injected and hardened in the inner peripheral surface 49a of the retainer 49. Alternatively, this sealing material may be used together with the sealing plate 51 and the covering portion 73.

The following is a description of technical ideas for the motor according to the present invention that can be grasped from the above embodiments or other examples and are not covered in claims.

The present invention is characterized in that: the board installation opening is formed in the speed reducing mechanism receiving portion; and the board receiving portion is so formed that the control circuit board can be housed through the board installation opening along the direction of the plane of the control circuit board.

The present invention is characterized in that: the guide wall is formed inside the speed reducing mechanism receiving portion for guiding the control circuit board inserted into the speed reducing mechanism receiving portion.

The stopper portions are characterized in that they are sloped and widened as it goes toward the inner surface of the speed reducing mechanism receiving portion.

The speed reducing mechanism receiving portion is characterized in that it comprises the gear housing in which the speed reducing mechanism is housed and the closing and fixing member in which the connector installation opening is formed.

According to the present invention, as mentioned in detail above, design freedom can be secured, and a motor having a drip-proof structure that is simple in shape and a method of manufacturing the motor can be provided.

What is claimed is:

1. A motor comprising:
a motor arrangement;
a speed reducing arrangement that includes:
    a speed reducing mechanism that decelerates rotation of the motor arrangement; and
    a speed reducing mechanism receiving portion that receives the speed reducing mechanism;
a control circuit board that is received in the speed reducing mechanism receiving portion, wherein at least motor-side terminals for supplying electric power to the motor arrangement are mounted on the control circuit board as electrical circuit components; and
a connector housing, to which an external connector for connecting with the motor-side terminals is fitted, wherein:
the connector housing is formed separately from the speed reducing mechanism receiving portion;
the connector housing at least includes:
    a connector supporting member that supports the external connector relative to the speed reducing mechanism receiving portion; and
    an installation opening sealing member that is elastically deformable;
the installation opening sealing member is interposed between the connector supporting member and an outer surface of the speed reducing mechanism receiving portion and is secured to a connector installation opening, which is formed in the speed reducing mechanism receiving portion;
the connector supporting member is formed into a tubular body and includes an annular flange portion, which protrudes outward from an outer peripheral surface of the connector supporting member; and
the installation opening sealing member is interposed between the flange portion and the outer surface of the speed reducing mechanism receiving portion, which is located around the connector installation opening.

2. A motor comprising:
a motor arrangement;
a speed reducing arrangement that includes:
    a speed reducing mechanism that decelerates rotation of the motor arrangement; and
    a speed reducing mechanism receiving portion that receives the speed reducing mechanism;
a control circuit board that is received in the speed reducing mechanism receiving portion, wherein at least motor-side terminals for supplying electric power to the motor arrangement are mounted on the control circuit board as electrical circuit components; and
a connector housing, to which an external connector for connecting with the motor-side terminals is fitted, wherein:
the connector housing is formed separately from the speed reducing mechanism receiving portion;
the connector housing at least includes:
    a connector supporting member that supports the external connector relative to the speed reducing mechanism receiving portion; and
    an installation opening sealing member that is elastically deformable;
the installation opening sealing member is interposed between the connector supporting member and an outer surface of the speed reducing mechanism receiving portion and is secured to a connector installation opening, which is formed in the speed reducing mechanism receiving portion;

the connector supporting member is formed into a tubular body, which has a bottom that includes through holes for receiving the motor side terminals theretrough; and a terminal sealing member is provided around the motor-side terminals, wherein the terminal sealing member is elastically deformable and is pressed against and brought into contact with the bottom of the connector supporting member.

3. A motor comprising:

a motor arrangement;

a speed reducing arrangement that includes:
- a speed reducing mechanism that decelerates rotation of the motor arrangement; and
- a speed reducing mechanism receiving portion that receives the speed reducing mechanism;

a control circuit board that is received in the speed reducing mechanism receiving portion, wherein at least motor-side terminals for supplying electric power to the motor arrangement are mounted on the control circuit board as electrical circuit components;

a connector block that supports the motor-side terminals relative to the control circuit board; and a connector housing, to which an external connector for connecting with the motor-side terminals is fitted wherein;

the connector housing is formed separately from the speed reducing mechanism receiving portion;

the connector housing at least includes:
- a connector supporting member that supports the external connector relative to the speed reducing mechanism receiving portion; and
- an installation opening sealing member that is elastically deformable;

the installation opening sealing member is interposed between the connector supporting member and an outer surface of the speed reducing mechanism receiving portion and is secured to a connector installation opening, which is formed in the speed reducing mechanism receiving portion; and a terminal sealing member is interposed between the connector supporting member and the connector block, and the terminal sealing member is elastically deformed between the connector supporting member and the connector block to seal between the connector supporting member and the connector block.

4. The motor according to claim 1, wherein the connector supporting member has a stopper portion that is anchored to an inner surface of the speed reducing mechanism receiving portion.

5. The motor according to claim 1, wherein:

the connector housing includes an inner panel sealing member;

the inner panel sealing member is brought into tight contact with a portion of an inner panel of a vehicle door, which is located around an insertion opening of the inner panel, so that the inner panel sealing member seals the insertion opening of the inner panel; and the inner panel sealing member is made as the same member as the installation opening sealing member.

6. The motor according to claim 5, wherein the inner panel sealing member is molded integrally with the installation opening sealing member.

7. The motor according to claim 5, wherein:

a terminal sealing member is provided around the motor-side terminals; and the inner panel sealing member is made as the same member as the terminal sealing member.

8. The motor according to claim 7, wherein the inner panel sealing member is molded integrally with the terminal sealing member.

9. The motor according to claim 5, wherein the inner panel sealing member is molded integrally with the connector supporting member.

10. The motor according to claim 1, wherein:

at least the motor arrangement and the speed reducing arrangement are disposed outside an inner panel of a vehicle door; and the external connector is inserted from inside the inner panel through an insertion opening formed in the inner panel.

11. A motor comprising:

a motor arrangement;

a speed reducing arrangement that includes:
- a speed reducing mechanism that decelerates rotation of the motor arrangement; and
- a speed reducing mechanism receiving portion that receives the speed reducing mechanism;

a control circuit board that is received in the speed reducing mechanism receiving portion, wherein at least motor-side terminals for supplying electric power to the motor arrangement are mounted on the control circuit board as electrical circuit components; and a connector housing, to which an external connector for connecting with the motor-side terminals is fitted, wherein:

the connector housing is formed separately from the speed reducing mechanism receiving portion;

the connector housing at least includes:
- a receiving member that receives the external connector; and
- an installation opening sealing member that is elastically deformable;

the installation opening sealing member is interposed between the receiving member and an outer surface of the speed reducing mechanism receiving portion and is secured to a connector installation opening, which is formed in the speed reducing mechanism receiving portion;

the receiving member is formed into a tubular body and includes an angular flange portion, which protrudes outward from an outer peripheral surface of the receiving member; and the installation opening sealing member is interposed between the flange portion and the outer surface of the speed reducing mechanism receiving portion, which is located around the connector installation opening.

* * * * *